United States Patent [19]

Koizumi

[11] Patent Number: 5,200,836
[45] Date of Patent: Apr. 6, 1993

[54] IMAGE COMMUNICATION APPARATUS WITH SUBSTITUTED RECEPTION WITH REDUCED MEMORY REQUIREMENT

[75] Inventor: Shigeru Koizumi, Urawa, Japan
[73] Assignee: Canon Kabushiki Kaisha, Tokyo, Japan
[21] Appl. No.: 446,479
[22] Filed: Dec. 5, 1989
[30] Foreign Application Priority Data
  Dec. 6, 1988 [JP] Japan .................................. 63-308141
[51] Int. Cl.$^5$ ............................................. H04N 5/782
[52] U.S. Cl. ..................................... 358/335; 358/341; 358/434; 358/442; 358/440
[58] Field of Search ............... 358/335, 341, 301, 434, 358/442, 443, 400, 440; 360/55, 19.1; 379/100

[56] References Cited

U.S. PATENT DOCUMENTS

| | | | |
|---|---|---|---|
| 3,914,539 | 10/1975 | Hashimoto | 358/440 X |
| 4,717,967 | 1/1988 | Yoshida | 358/296 |
| 4,785,355 | 11/1988 | Matsumoto | 358/257 |
| 4,789,900 | 12/1988 | Takahashi | 358/257 |
| 4,900,902 | 2/1990 | Sakakibara | 235/375 |
| 4,907,094 | 3/1990 | Mishima et al. | 358/437 |

FOREIGN PATENT DOCUMENTS 245904 11/1987 European Pat. Off. .
62-242449 10/1986 Japan .
63-88949 4/1988 Japan .

Primary Examiner—Robert L. Richardson
Attorney, Agent, or Firm—Fitzpatrick, Cella, Harper & Scinto

[57] ABSTRACT

There is disclosed a facsimile apparatus with a memory reception function, for storing the received image data in a memory for later output as an image, without a large-capacity memory. The apparatus is equipped with a magnetic tape which is used for storing the received image data as well as the received voice message, thus dispensing with the large-capacity memory.

10 Claims, 9 Drawing Sheets

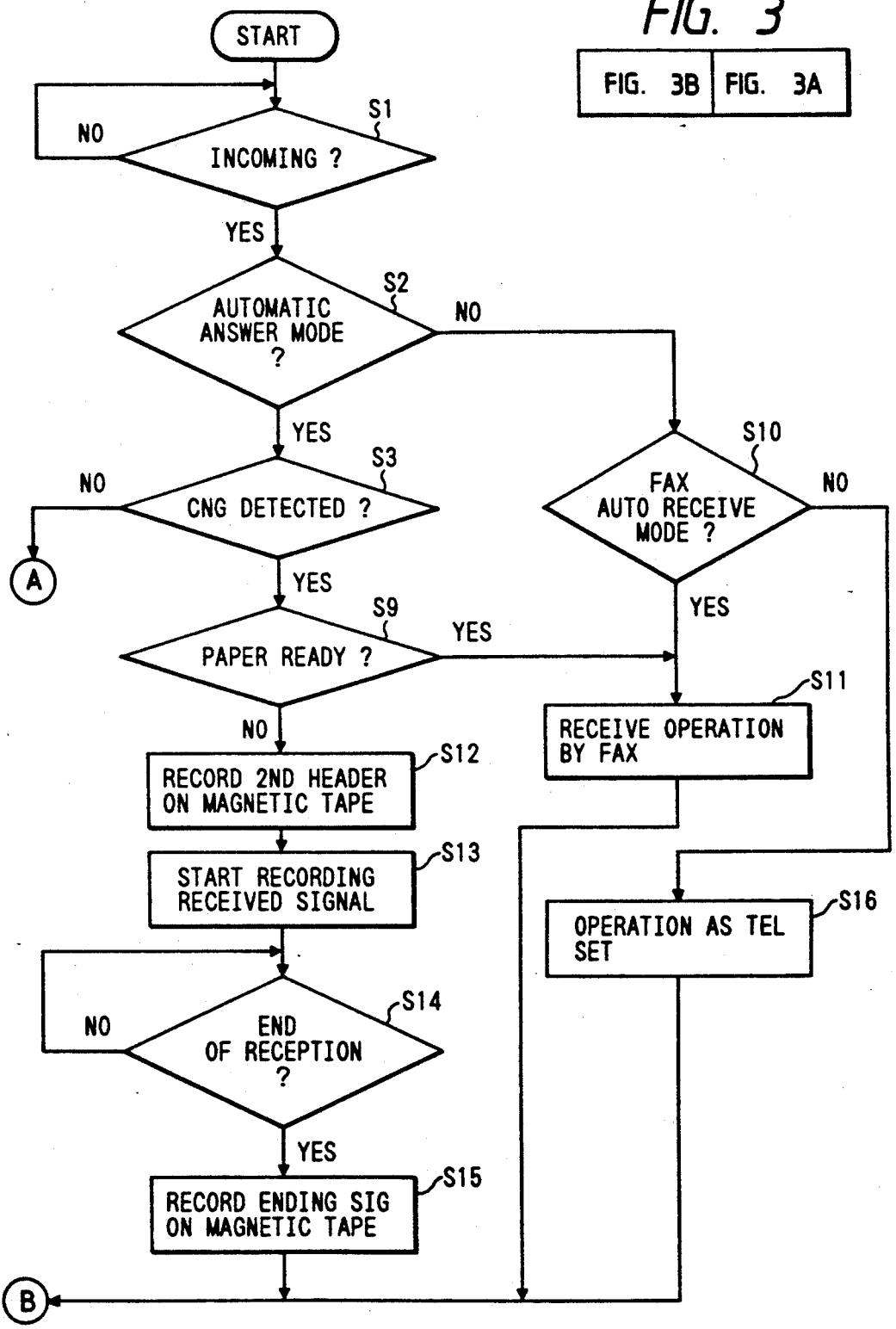

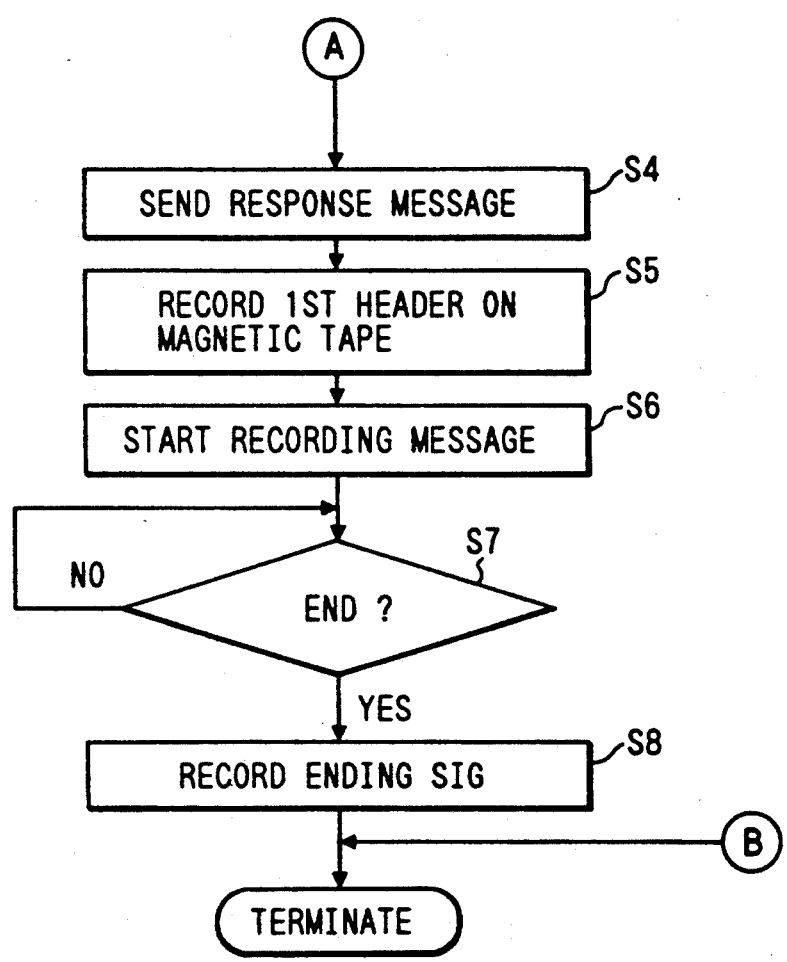

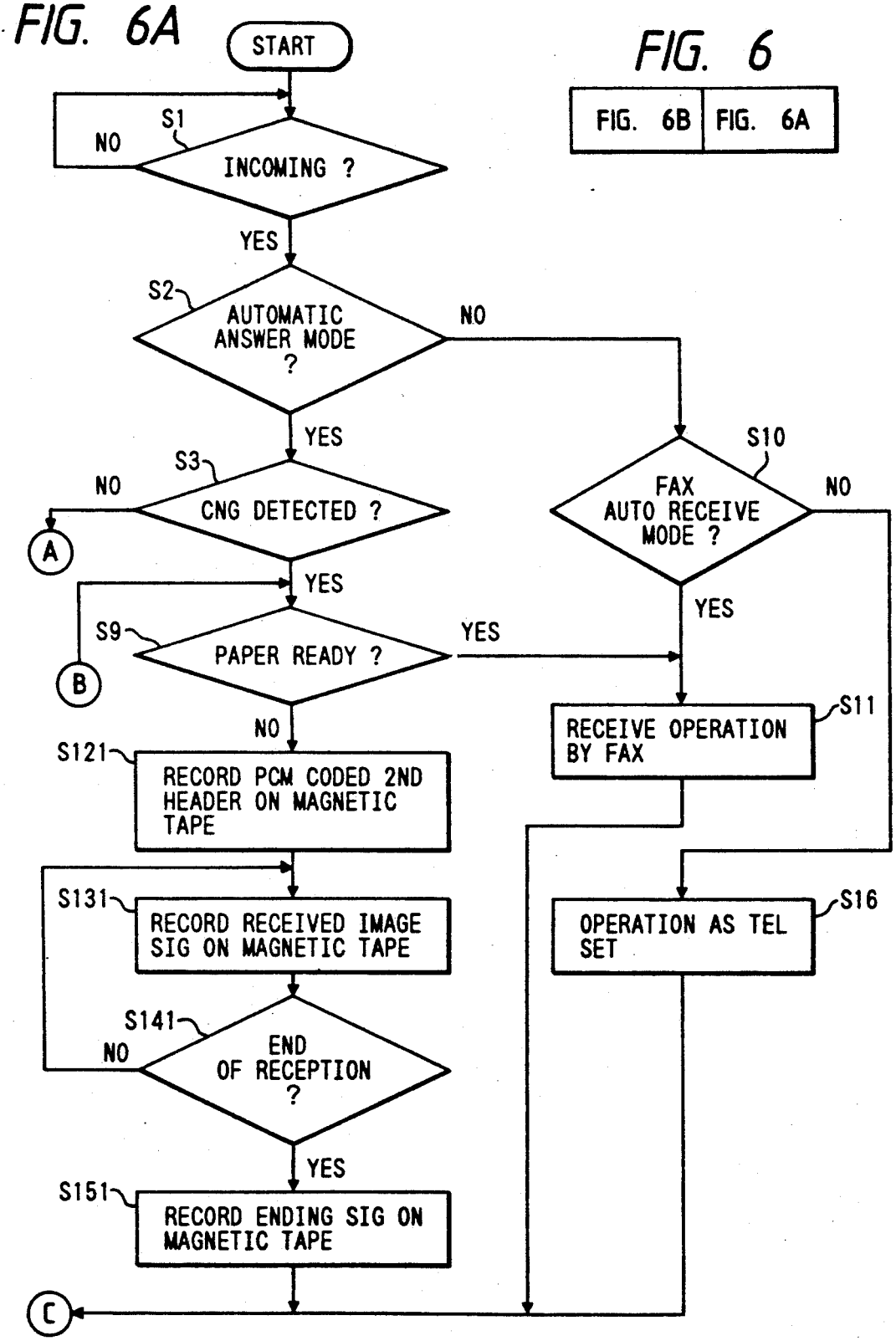

IMAGE COMMUNICATION APPARATUS WITH SUBSTITUTED RECEPTION WITH REDUCED MEMORY REQUIREMENT

BACKGROUND OF THE INVENTION

1. Field of the Invention

The present invention relates to an image communication apparatus with a memory reception function.

2. Related Background Art

There is already known a facsimile apparatus capable, upon automatically receiving image data from another facsimile apparatus when no recording sheets are present, of storing said image data in a memory and printing said data after the recording sheets are replenished.

Such facsimile apparatus is equipped with a large-capacity memory for such "substituted" reception.

Such substituted reception in memory is disclosed, for example, the U.S. Pat. Nos. 4,717,967, 4,785,355 4,789,900, 4,900,902, 4,907,094 in U.S. Ser. Nos 282,684 (filed on Dec. 12, 1988) and 352,830 (filed on May 16, 1989).

However, such facsimile apparatus is inevitably expensive because a large-capacity memory is required for the substituted reception in memory.

SUMMARY OF THE INVENTION

In consideration of the foregoing, an object of the present invention is to provide an improvement of such image communication apparatus.

Another object of the present invention is to provide an image communication apparatus capable of substituted reception in the absence of recording sheets, without the use of expensive large-capacity memory, thus being constructed inexpensively.

Still another object of the present invention is to provide an image communication apparatus without limitation in the memory capacity, through the use of a magnetic tape as a memory for substituted reception.

Still another object of the present invention is to provide an inexpensive image communication apparatus capable of multiple functions through the use of a magnetic tape for an automatic answering telephone mode as the memory for substituted reception.

Still other objects features and advantages of the present invention will become fully apparent from the following description of the preferred embodiments, taken in conjunction with the attached drawings.

BRIEF DESCRIPTION OF THE DRAWINGS

FIG. 3, consisting of FIGS. 3A and 3B, is a flow chart of the substituted receiving operation in the facsimile apparatus of said embodiment;

DETAILED DESCRIPTION OF THE PREFERRED EMBODIMENTS

Now the present invention will be clarified in detail by embodiments description of the preferred thereof, which are shown in the attached drawings.

Figure 1:
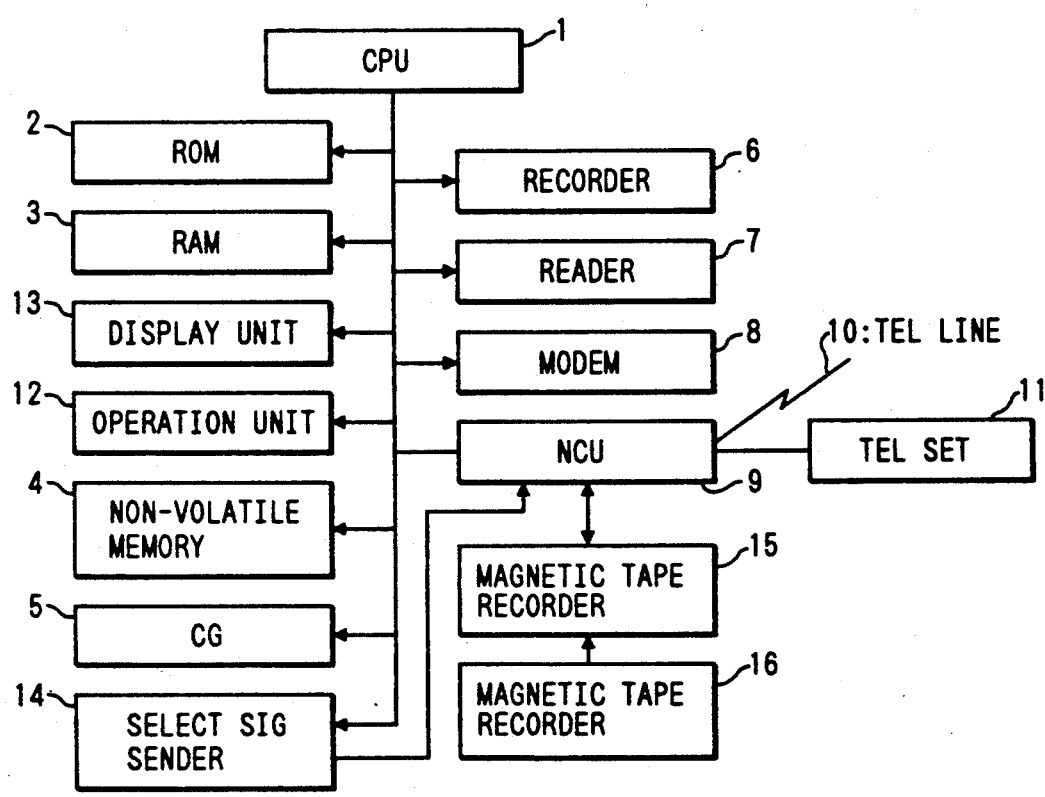
FIG. 1 is a block diagram of a facsimile apparatus constituting an embodiment of the present invention.

FIG. 1 is a block diagram of a facsimile apparatus constituting an embodiment of the present invention.

A CPU 1 controls, according to a program stored in a ROM 2, the entire facsimile apparatus including a RAM 3, a non-volatile RAM 4, a character generator (CG) 5, a recording unit 6, a reading unit 7, a modem unit 8, a network control unit (NCU) 9, a telephone set 11, an operation unit 12, a display unit 13, a selection signal sender unit 14, and magnetic tape recorders 15, 16.

The RAM 3 stores binary image data read by the reading unit 7, or binary image data recorded in the recording unit 6. The RAM 3 also serves to store binary image data modulated by the modem unit 8 and to be supplied to a telephone line 10 through the NCU 9, and binary data demodulated by the NCU 9 and the modem unit 8 from analog signals received from the telephone line 10.

The non-volatile RAM 4 stores data to be preserved when the power supply of the facsimile apparatus is cut off.

The character generator (CG) 5 stores characters, for example in JIS codes or ASCII codes, and releases character data corresponding to entered codes, under the control of the CPU 1.

The recording unit 6 is composed of a DMA controller, a sub-CPU, an A5-sized thermal head, a TTLIC, etc., and prints hard copies under the control of the CPU 1, receiving the recording data stored in the RAM 3.

The reading unit 7 is composed of a DMA controller, a sub-CPU, a CCD, a TTLIC, an A4/A5 senser, etc., and binarizes the data read with the CCD and sends thus binarized data to the RAM 3 in succession, under the control of the CPU 1.

The modem unit 8 is composed of G3, G2, G1 and FM modems, a clock generator circuit connected to said modems, a voice/DTMF detection circuit, etc., and serves to modulate the transmission data stored in the RAM 3 and sends the modulated data to the telephone line 10 through the NCU 9 under the control of the CPU 1. In addition, the modem unit 8 serves to receive the analog signals from the telephone line 10 through the NCU 9 and stores the demodulated and binarized data in the RAM 3.

The NCU 9 connects the telephone line 10 either to the modem unit 8 or to the telephone unit 11 under the control of the CPU 1.

The operation unit 12 is provided with keys for starting transmission or reception, mode selection keys for selecting operation modes, such as fine mode, standard mode, auto reception, etc., and numeral keys. The operation unit 12 of the present embodiment is provided, in addition, with a manual/telefax switch and a memory reception select/non-select switch. The display unit 13 is composed of a liquid crystal display unit for example 16 digits, for displaying messages under the control of the CPU 1.

The selection signal sending unit 14 serves to send selection signals such as a pulse dialer or a tone dialer through the NCU 9, under the control of the CPU 1.

The magnetic tape recorder 15 is for message recording, and serves to record or reproduce voice signals and facsimile signals received from the telephone line 10 through the NCU 9, under the control of the CPU 1.

Figure 2:
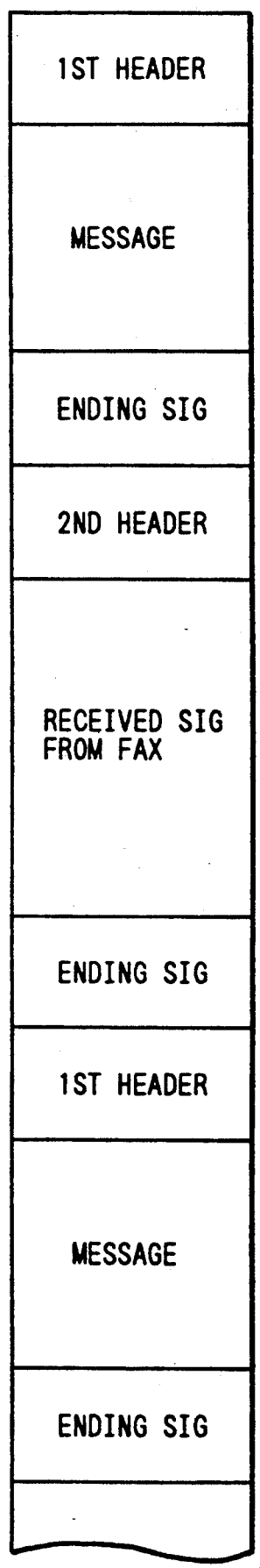
FIG. 2 is a schematic view showing an example of data recorded on a magnetic tape for automatic answering in the facsimile apparatus of said embodiment.

FIG. 2 illustrates the content of signals recorded by the magnetic tape recorder 15, on a magnetic tape for automatic answering the telephone.

In this example there are recorded a telephone identification header (first header) indicating the presence of a message automatic answering of the telephone, then the message, and an end signal. Then are recorded a facsimile identification header (second header) indicating the presence of a reception signal from a facsimile apparatus, then a facsimile reception signal (protocol signal and image signal), and an end signal. Then recorded are again a telephone identification header (first header), a message from automatic answering of the telephone and an end signal.

The facsimile identification header and the telephone identification header have mutually different frequencies, for identification. Consequently the modem unit 8 can identify, by analyzing said identification header, if the magnetic tape records a facsimile reception signal or a message from automatic answering of the telephone.

The magnetic tape recorder 16 is for recording a response message, and serves to reproduce a prerecorded message and send said message through the telephone line in voice communication.

FIG. 3 is a flow chart of a substituted reception operation in the above-explained facsimile apparatus.

If a call is received from another apparatus in the automatic answering mode (steps S1, S2), the NCU secures the line and the modem unit 8 executes detection, for a predetermined period, of the CNG (a call tone indicating that the calling unit is a non-voice signal terminal) of the facsimile protocol signal (step S3). The automatic answering mode is set by a mode selector switch in the operation unit, and the automatic answering mode is identified from the state of said switch.

If the CNG is not detected, the call is identified as coming from a telephone set, and the response message for automatic answering is reproduced from the magnetic tape recorder 16 and sent to the calling unit (step S4). Then the magnetic tape recorder 15 records the telephone identification header (first header) of the magnetic tape (step S5), and starts recording the message, (step S6). The message recording is identified as being completed when the polarity of the telephone line 10 is inverted or when the voice is not detected for a predetermined period (step S7), and an end signal is recorded on the magnetic tape (step S8).

On the other hand, if the step S3 detects the CNG signal, the call is identified as coming from a facsimile apparatus. If recording sheets are present in the recording unit (step S9), there is conducted a normal facsimile receiving operation to record the received image data in the recording unit 6 (step S11). If the recording sheets are absent in the recording unit (step S9), the magnetic tape recorder 15 records a facsimile identification header (second header) on the magnetic tape (step S12), and starts recording the received facsimile signal (protrocol signal and image signal) (step S13). Then, in response to the completion of reception (step S14), an end signal is recorded on the magnetic tape (step S15). The CNG signal is used as the facsimile identification header to be recorded on the magnetic tape. The CPU 1 records the facsimile image on the magnetic tape and checks the presence of errors by demodulation and decoding with the modem 8, and invalidates any erroneous image recorded on the magnetic tape.

If the automatic answering mode is not selected (step S2), and if the automatic facsimile reception mode is selected (step S10), there is executed a normal facsimile reception operation (step S11). If the automatic facsimile reception mode is not selected (step S10), an ordinary telephone function is executed (step S16).

Figure 4:
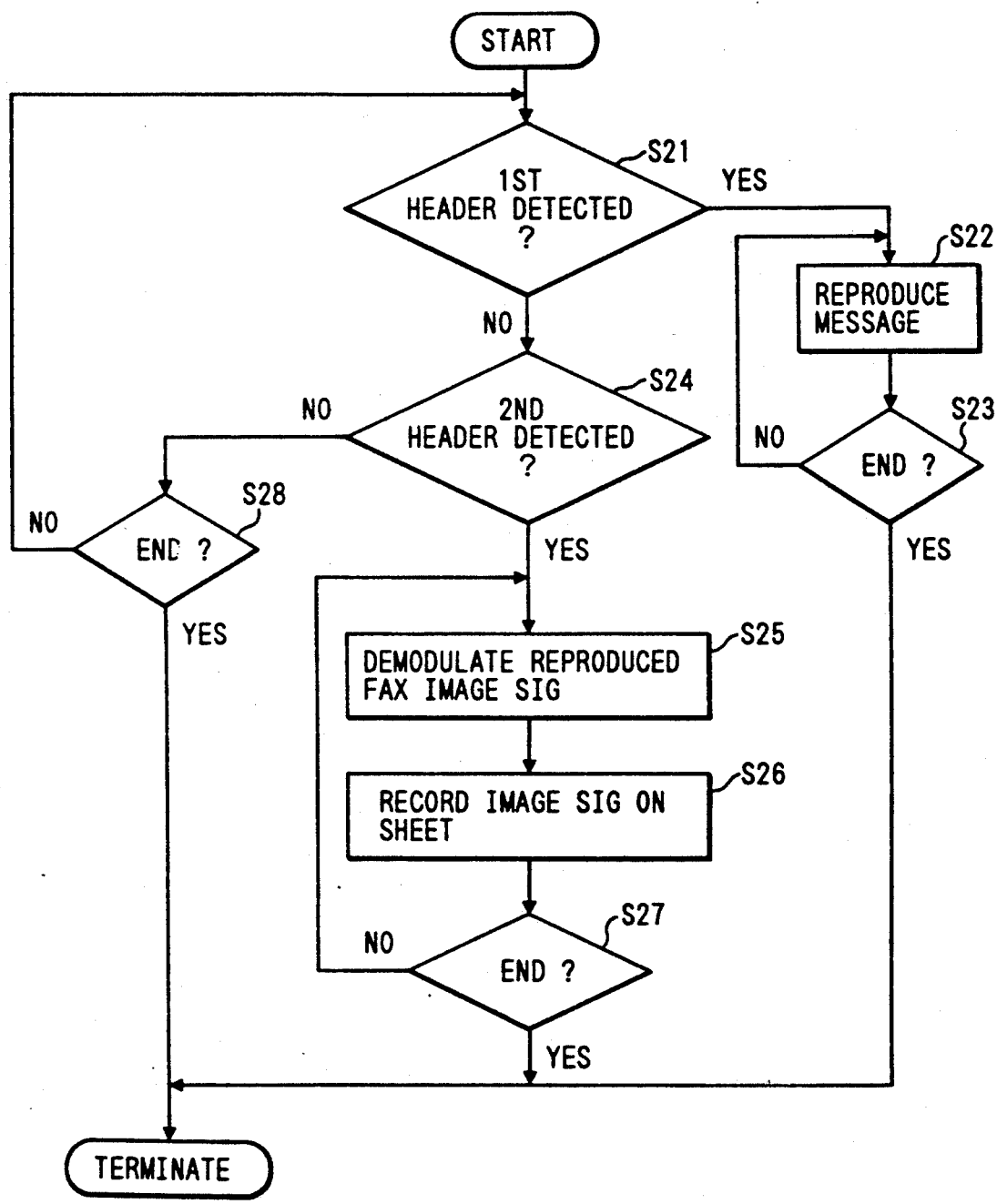
FIG. 4 is a flow chart of reproduction of signals recorded on said magnetic tape for automatic answering.

FIG. 4 is a flow chart of reproduction of the signal recorded on the magnetic tape by the magnetic tape recorder 15.

At first reproduction from the magnetic tape is started, and the modem unit 8 analyzes the reproduced signal to detect the identification header (steps S21, S24, S28). If the first header is detected (steps S21), the message recorded in the automatic answering mode is reproduced (step S22).

If the second header is detected (step S24) indicating the presence of a received facsimile signal, the reproduced signal is demodulated (step S25), and the image data therein are recorded on the recording sheet (step S26).

Then, in response to the detection of the end signal (step S23, S27, S28), the magnetic tape recorder 15 repeats the reproducing operation.

The above-mentioned magnetic tape recorders 15, 16 may be replaced by digital audio tape recorders (DAT), and there may be employed only one digital audio tape recorder for reproduction of the audio response message, recording of the received voice message and the recording of image data.

In the following there will be explained a second embodiment employing such digital audio tape recorder, of which block diagram is, shown in FIG. 5.

Figure 5:
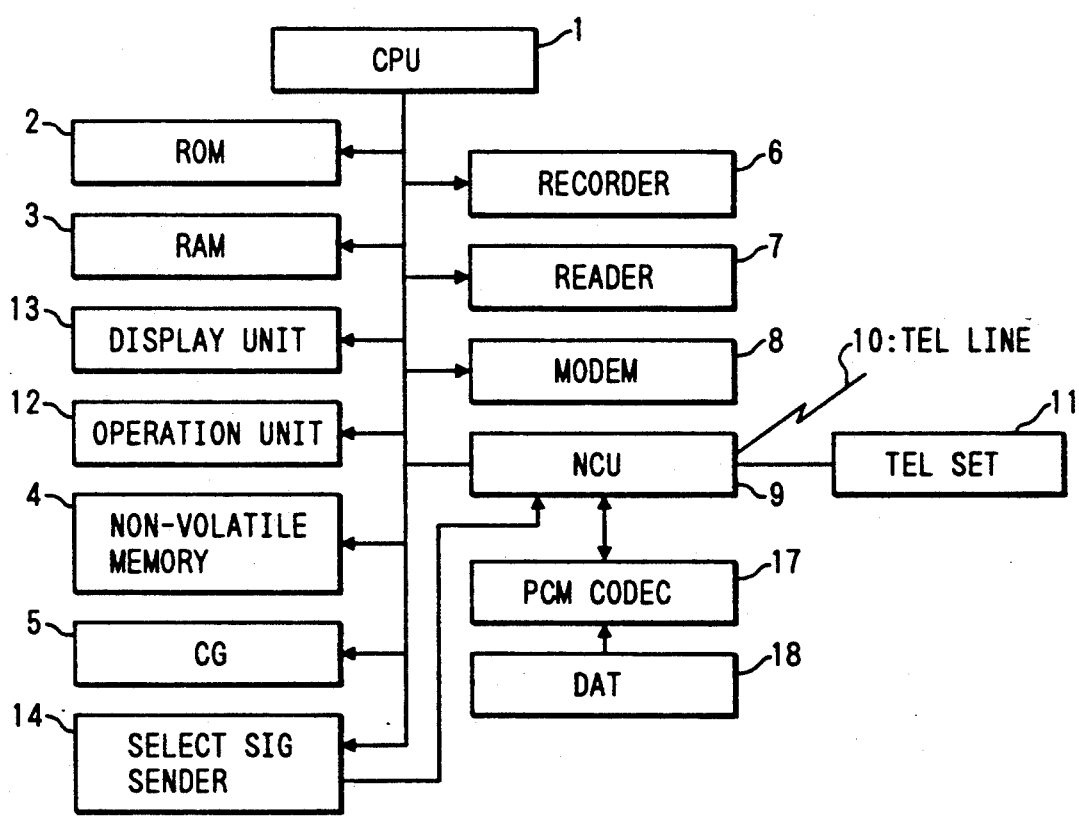
FIG. 5 is a block diagram of a second embodiment.

In FIG. 5, the same components as those in FIG. 1 are represented by same numbers, and will not be explained further.

A PCM codec 17 converts the analog voice message, received from the telephone line 10, by PCM encoding into a digital voice message and sends it to the DAT 18. It also converts the PCM encoded digital voice message from the DAT 18 into an analog voice message, and reproduces the voice message through the NCU 9 and the speaker of the telephone set 11.

In a case of recording the received facsimile image signal on the magnetic tape by means of the DAT 18, the CNG signal is PCM encoded and recorded as the identification header (second header) on the magnetic tape, and the digital image information (encoded for example by MH or MR encoding) is demodulated and recorded on the magnetic tape. In this operation,, the, CPU 1 demodulates the image information and checks for the presence of errors in the received image. If there is an error in the received image, the CPU 1 informs the sending apparatus of said image error by the facsimile communication protocol.

Figure 6B:
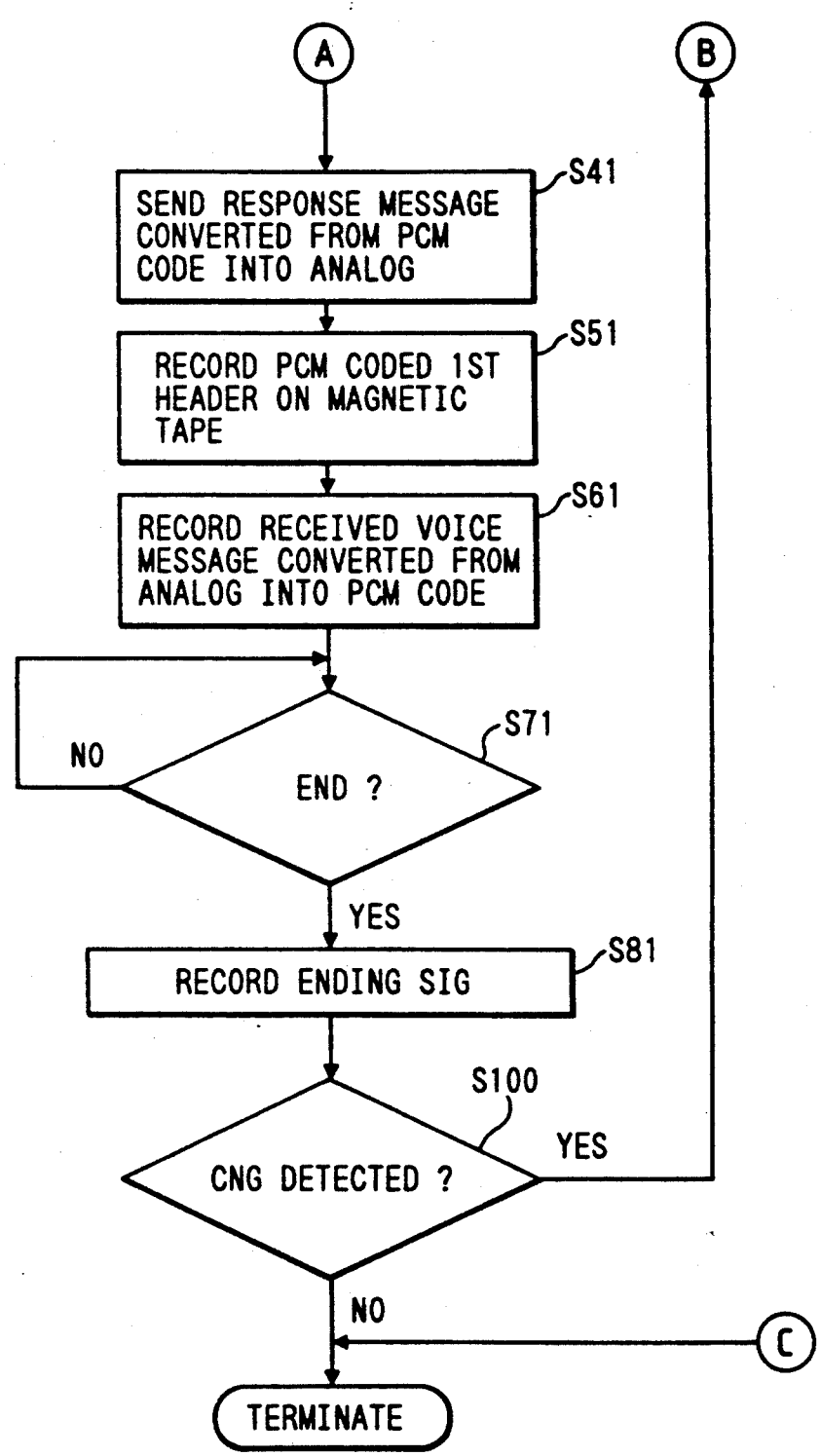
FIG. 6, consisting of FIGS. 6A and 6B, is a flow chart of a control sequence for signal reception in said second embodiment.

FIG. 6 is a flow chart showing the control sequence of the CPU 1 for call reception in the second embodiment, wherein the steps having the same numbers as in FIG. 3 indicate the same operations. The present second embodiment is different in the steps S4–S8 and S12–S15 from the sequence shown in FIG. 3.

At first, if the step S3 does not detect the CNG signal, the sequence proceeds to a step S41 for effecting voice response and recording of the voice message by the DAT 18, as will be explained in the following.

The step S41 reads the PCM encoded digital voice message for voice response, recorded on the magnetic tape of the DAT 18 and sends it to the telephone line 10 after conversion into an analog voice message by the PCM codec 17. Then a step S51 records the PCM encoded first header on the magnetic tape of the DAT 18 through the PCM codec 17. Then steps S61 and S71 convert the analog voice message, received from the telephone line 10, into digital voice information by the PCM codec 17 and records it on the magnetic tape of the DAT 18. When the recording of voice message is completed in this manner, a step S81 records an end signal, indicating the end of the voice message, on the magnetic tape of the DAT 18, and the sequence proceeds to a step S100. Said step S100 discriminates whether the CNG signal is received within a predetermined period (for example 15 seconds), and, if received, the sequence proceeds to a step S9 for effecting the facsimile reception.

Then, in a case of effecting the substituted memory reception by the magnetic tape of the DAT 18, the sequence proceeds from the step S9 to a step S121 for recording the second header, PCM encoded by the PCM codec 17, on the magnetic tape of the DAT 18. Then steps S131 S141 record the digital encoded image information, demodulated by the modem 48, in succession on the magnetic tape of the DAT 18. During this operation, the CPU 1 checks for the presence of errors in the image, by demodulating the digital image information. After the reception of all the image information, a step S151 records the end signal, PCM encoded by the PCM codec 17, on the magnetic tape of the DAT 18.

As explained above, the voice message is recorded on the magnetic tape in the PCM encoded form, while the image is recorded in the form of digital image information encoded for example by MH or MR encoding.

Figure 7:
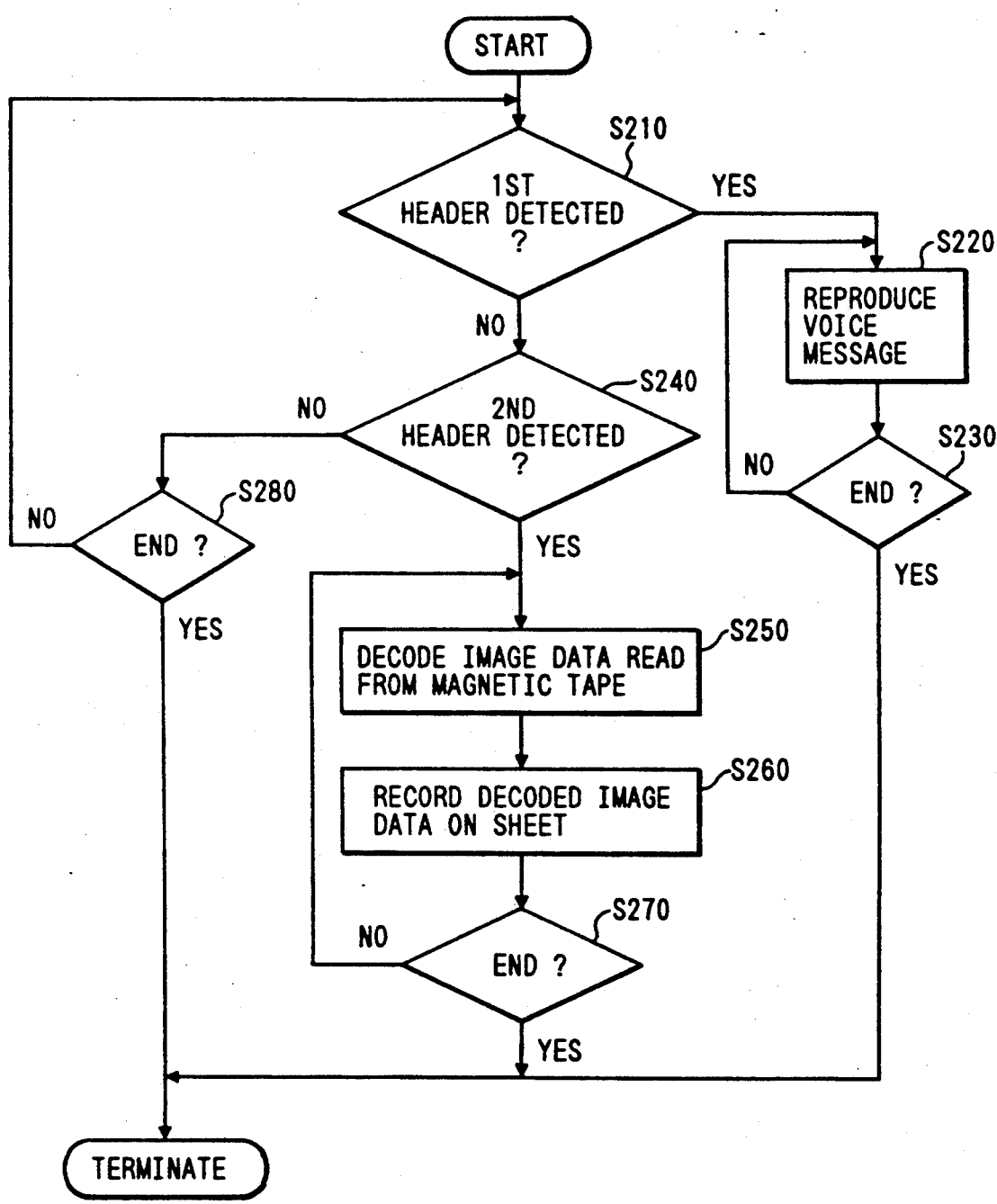
FIG. 7 is a flow chart of a control sequence for voice message reproduction and image data recording in said second embodiment.

FIG. 7 is a flow chart of the control sequence of the CPU 1 for reproduction of the voice message stored for in the magnetic tape of the second embodiment, and for printing of image information.

At first steps, S210, S240 and S280 convert the PCM encoded information on the magnetic tape of the DAT 18 into an analog signal by the PCM codec 17, and detects the frequency thereof through the modem 8. If the first or second header is detected in the manner, the sequence proceeds from the step S210 to S220, or from S240 to S250, respectively. The step S220 converts the digital voice message recorded on the magnetic tape of the DAT 18 into an analog voice message by the PCM codec 17, and releases it from the loudspeaker of the telephone set 11. Then a step S230 detects the end signal through the modem 8, and, upon detection thereof, the reproduction of the voice message is completed.

In a case where the sequence proceeds to steps S250, S260 and S270, the digital facsimile image information recorded on the magnetic tape is read and demodulated in succession, and the obtained image information is printed by the recording unit 6. Then the step S270 detects the end signal through the modem 8, and, the printing of image information is terminated.

As explained in the foregoing, substituted reception of the facsimile signal in the absence of recording sheets can be achieved by the magnetic tape for automatic answering telephone.

Thus, if a call is received from another facsimile apparatus in the absence of recording sheets, the magnetic tape for automatic answering telephone can be utilized for substituted reception. Consequently the expensive large-capacity memory for substituted reception can be dispensed with, and the facsimile apparatus can therefore be made less expensive. In addition the magnetic tape for automatic answering telephone can be effectively utilized.

Also the image information and the voice message can be processed by the CPU 1, as they are both recorded on the digital audio tape.

The present invention is not limited to the foregoing embodiments, but is subject to various modifications within the scope and spirit of the appended claims.

What is claimed is:

1. An image communication apparatus comprising: magnetic recording means for recording on a magnetic tape;
    reception means for receiving image data from outside said apparatus; and
    control means for causing said magnetic recording means to record the image data received by said reception means on the magnetic tape,
    wherein said control means adds to the image data extra information for identifying the image data as image data, and then causes recording of the image data and the extra information on the magnetic tape.

2. An apparatus according to claim 1, further comprising second recording means for recording the image data received by said reception means, wherein said control means is structured and arranged to cause recording of the image data on the magnetic tape whenever said second recording means is incapable of recording.

3. An apparatus according to claim 1, wherein said control means is structured and arranged to cause said magnetic recording means to record the image data and a voice message as an analog signal on the magnetic tape.

4. An apparatus according to claim 1, wherein said control means is structured and arranged to cause said magnetic recording means to record the image data and a voice message as a digital signal on the magnetic tape.

5. An apparatus according to claim 1, further comprising means for reproducing a voice message recorded on the magnetic tape.

6. An apparatus according to claim 1, further comprising means for recording on a second recording medium the image data recorded on said magnetic tape.

7. An image communicating apparatus with an automatic telephone-answering function, said apparatus comprising:
    magnetic recording means for recording an identification signal, which indicates data type, and an image signal on a magnetic tape, in response to receiving a call from another apparatus while in an automatic answering mode and while no recording sheets are present;
    detection means for identifying the identification signal as indicating image data recorded on the magnetic tape, upon reproduction of what is recorded on the magnetic tape;
    demodulation means for demodulating an image signal reproduced from the magnetic tape when the identification signal for image data is detected by said detection means; and
    recording means for printing an image represented by the image signal demodulated by said demodulation means, on a recording sheet.

8. An image communication apparatus comprising: magnetic recording means for recording data on a magnetic tape;

first receiving means, for receiving image data;

second receiving means, for receiving a voice message; and control means for causing said magnetic recording means to record any image data received by said first receiving means on the magnetic tape, after addition to the image data of identification information indicating image data, and for causing said magnetic recording means to record any voice message received by said second receiving means on the magnetic tape, after addition of identification information indicating a voice message;

9. An apparatus according to claim 8, further comprising:

means for printing image data; and means for reproducing a voice message, wherein said control means controls the reproduction from the magnetic tape, according to said identification information.

10. An apparatus according to claim 8, wherein voice messages and image data are recorded on the magnetic tape in mixed manner.

* * * * *

UNITED STATES PATENT AND TRADEMARK OFFICE
CERTIFICATE OF CORRECTION

PATENT NO. : 5,200,836
DATED : April 6, 1993
INVENTOR(S) : SHIGERU KOIZUMI

Page 1 of 2

It is certified that error appears in the above-identified patent and that said Letters Patent is hereby corrected as shown below:

COLUMN 1

Line 20, "U.S." should read --U.S. Patent Application--.

COLUMN 2

Line 5, "embodiments description of the preferred" should read --description of the preferred embodiments--.

COLUMN 3

Line 10, "message" should read --message from--.

COLUMN 4

Line 34, "is," should read --is--.
Line 51, "operation,," should read --operation,--.

COLUMN 5

Line 23, "S131" should read --S131 and--.
Line 42, "detects" should read --detect--.

COLUMN 6

Line 46, "communicating" should read --communication--.

UNITED STATES PATENT AND TRADEMARK OFFICE
CERTIFICATE OF CORRECTION

PATENT NO. : 5,200,836
DATED : April 6, 1993
INVENTOR(S) : SHIGERU KOIZUMI

It is certified that error appears in the above-identified patent and that said Letters Patent is hereby corrected as shown below:

COLUMN 8

Line 2, "message;" should read --message.--.

Signed and Sealed this

Twelfth Day of April, 1994

*Attest:*

BRUCE LEHMAN

*Commissioner of Patents and Trademarks*

*Attesting Officer*